United States Patent
Lee et al.

(10) Patent No.: US 6,657,942 B2
(45) Date of Patent: Dec. 2, 2003

(54) OPTICAL RECORDING AND REPRODUCING APPARATUS HAVING FLOATING SWING ARM AND OPTICAL DISK FOR USE THEREWITH

(75) Inventors: Chul-woo Lee, Seongnam (KR); Joong-eon Seo, Uiwang (KR); Seung-tae Jung, Seongnam (KR); Myong-do Ro, Suwon (KR); Kun-ho Cho, Suwon (KR); Dong-seob Jang, Seoul (KR); Jang-hoon Yoo, Seoul (KR); Dae-sik Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 79 days.

(21) Appl. No.: 09/778,856

(22) Filed: Feb. 8, 2001

(65) Prior Publication Data
US 2002/0024919 A1 Feb. 28, 2002

(30) Foreign Application Priority Data
Jul. 24, 2000 (KR) ............................... 2000-42364

(51) Int. Cl.$^7$ ................................. G11B 7/00
(52) U.S. Cl. ................ 369/112.24; 369/275.5
(58) Field of Search ................. 369/44.15, 44.14, 369/44.16, 44.23, 44.24, 112.01, 112.23, 112.24, 112.25, 112.26, 275.5, 283

(56) References Cited

U.S. PATENT DOCUMENTS

| 5,497,359 A | * | 3/1996 | Mamin et al. | ............. 369/44.14 |
| 5,995,474 A | * | 11/1999 | Shimano et al. | ......... 369/44.12 |
| 6,243,350 B1 | * | 6/2001 | Knight et al. | ............. 369/44.24 |
| 6,396,638 B1 | * | 5/2002 | Yoo et al. | ................. 369/44.11 |

FOREIGN PATENT DOCUMENTS

| JP | 9-318873 | 12/1997 |
| JP | 10-326435 | 9/1998 |
| JP | 11-7658 | 1/1999 |
| JP | 2000-19388 | 1/2000 |
| JP | 2000-30295 | 1/2000 |
| JP | 2000-76651 | 3/2000 |
| JP | 2000-99990 | 3/2000 |
| JP | 2000-171612 | 6/2000 |
| JP | 2000195103 | 7/2000 |
| JP | 2000-90177 | 4/2002 |

* cited by examiner

Primary Examiner—Paul W. Huber
(74) Attorney, Agent, or Firm—Staas & Halsey LLP

(57) ABSTRACT

A swing-arm type optical recording and reproducing apparatus and an optical disk applicable to the same. The optical disk includes a substrate having an information recording surface to record and reproduce an information signal, and a protective layer which is provided on the information recording surface and whose surface facing a slider is a flat even surface so that variations in a floating height of the slider can be reduced. The optical recording and reproducing apparatus further includes, an optical head having a light source provided at a swing arm to emit light of a predetermined wavelength; an optical path changing means provided in the optical path of the light emitted from the light source for changing the proceeding path of incident light; a collimating lens installed at the slider to preliminarily converge the light emitted from the light source and entering via the optical path changing means; an objective lens installed at the slider to converge the light which is emitted from the light source and enters via the optical path changing means to form an optical spot on the optical disk; and a photodetector to receive the light which is reflected from the optical disk and enters via the objective lens, the collimating lens, and the optical path changing means. The optical head detects an information signal and an error signal in order to reduce defocus due to variations in ambient temperature and variations in the wavelength of the light of the light source.

30 Claims, 8 Drawing Sheets

OPTICAL RECORDING AND REPRODUCING APPARATUS HAVING FLOATING SWING ARM AND OPTICAL DISK FOR USE THEREWITH

CROSS-REFERENCE TO RELATED APPLICATIONS

This application claims the benefit of Korean Application No. 00-42364, filed Jul. 24, 2000, in the Korean Patent Office, the disclosure of which is incorporated herein by reference.

BACKGROUND OF THE INVENTION

1. Field of the Invention

The present invention relates to a swing-arm type optical recording and reproducing apparatus and an optical disk applicable to the same. More particularly, the present invention relates to a swing-arm type optical recording and reproducing apparatus adapted to prevent defocus due to variations in the temperature and wavelength of illuminating light, and an optical disk which is applied to the optical recording and reproducing apparatus so that the swing arm of the optical recording and reproducing apparatus can swing stably.

2. Description of the Related Art

Figure 1:
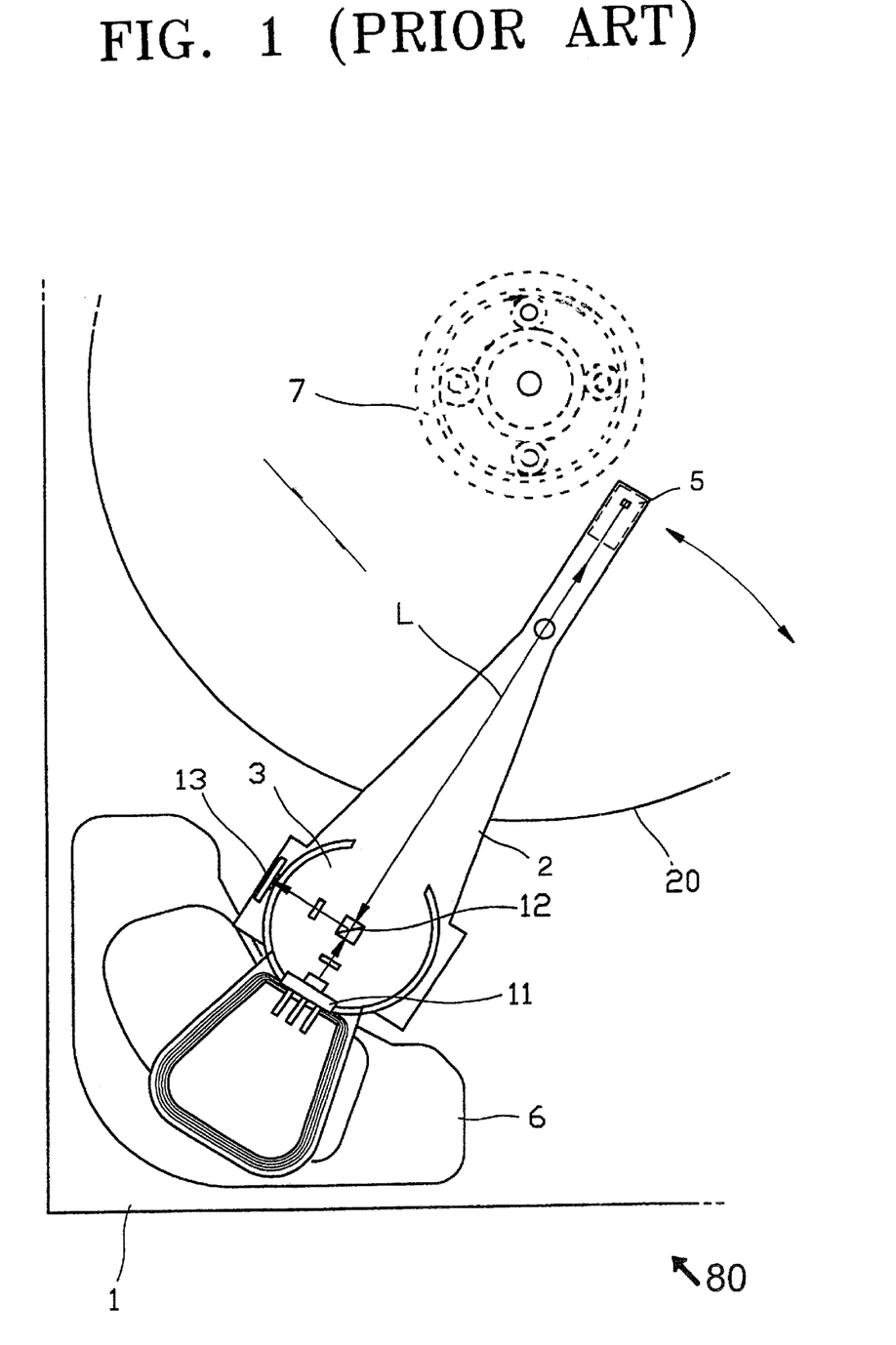
FIG. 1 is a schematic plan view illustrating a conventional swing-arm type optical recording and reproducing apparatus.
Figure 2:
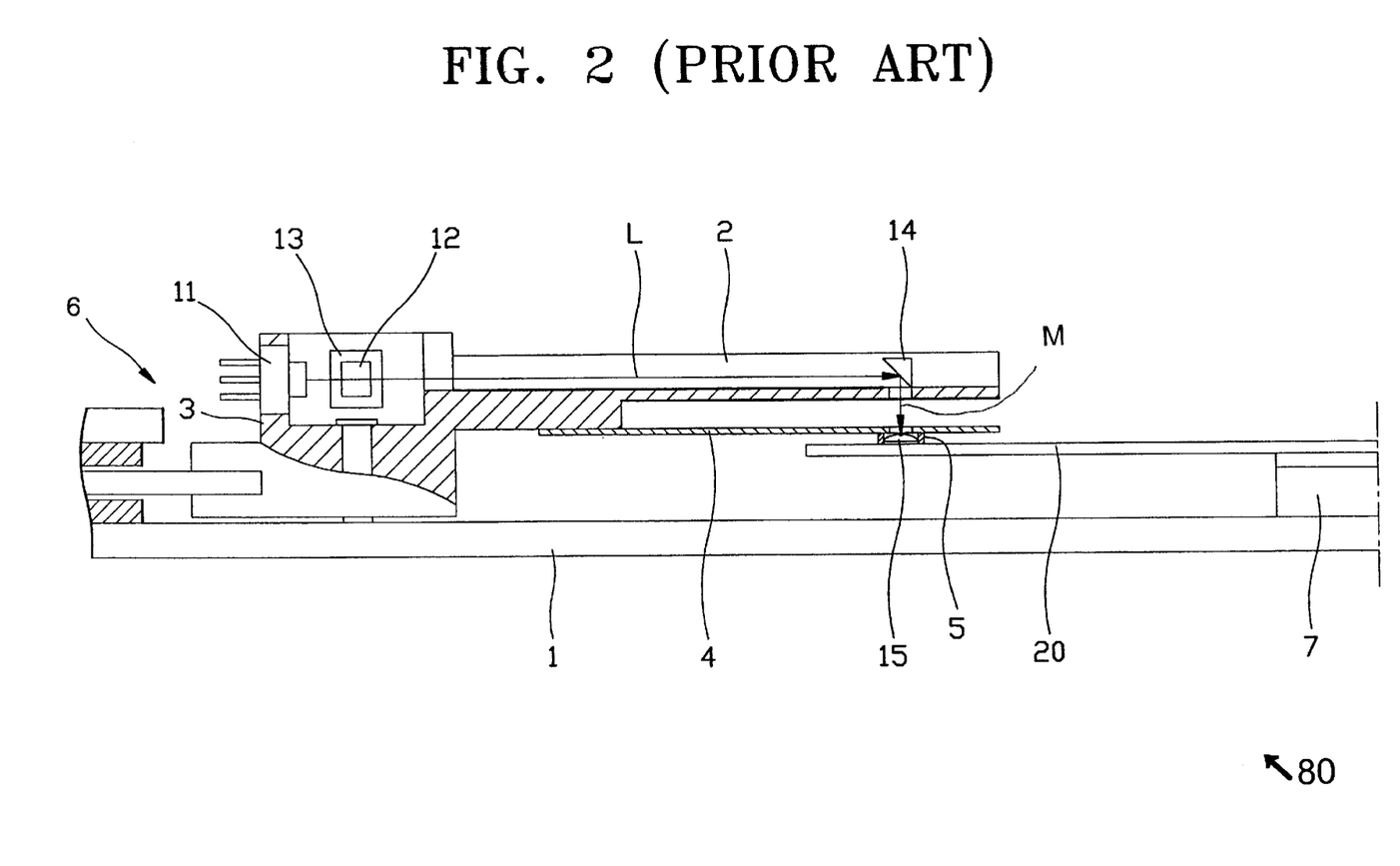
FIG. 2 is a sectional view schematically illustrating an essential portion of FIG. 1.

As shown in FIGS. 1 and 2, a conventional swing-arm type optical recording and reproducing apparatus 80 includes a swing arm 2 installed to pivot on a base 1, an actuator 6 for providing a rotational driving force for the swing arm 2, a slider 5 installed at an end portion of the swing arm 2 for scanning a track of an optical disk 20 while floating, due to a dynamic air pressure, on the optical disk 20 supported and rotated by a spindle motor 7, and an optical head installed at the swing arm 2 and the slider 5 in order to optically record/reproduce information.

The optical head includes a light source 11 installed on a mount 3 of the swing arm 2, a beam splitter 12, a photodetector 13, and an objective lens 15 installed at the slider 5. The beam splitter 12 changes the path of incident rays by passing or reflecting the incident rays. That is, the beam splitter 12 passes the rays entering from the light source 11 to direct the rays toward the objective lens 15, and reflects the rays entering from the objective lens 15 to direct the rays toward the photodetector 13. The photodetector 13 detects an information signal recorded on the optical disk 20 and a track error signal.

In the swing-arm type optical recording and reproducing apparatus 80, the swing arm 2 is swung by the driving force of the actuator 6 in a radial direction of the optical disk 20. At this time, a beam L, having passed through the beam splitter 12 after being emitted from the light source 11, is reflected from a reflecting member 14 installed at the end portion of the swing arm 2. A reflected beam M enters and is converged by the objective lens 15 installed at the slider 5, and is focused on a recording surface of the optical disk 20. Subsequently, the beam reflected from the optical disk 20 travels toward the beam splitter 12 via the objective lens 15 and the reflecting member 14, and is reflected toward the photodetector 13 from the beam splitter 12. The photodetector 13 receives incident light, and detects the information signal and the track error signal of the objective lens 15.

In the optical recording and reproducing apparatus 80, the focus position of a beam spot is adjusted by the floatation of the slider 5 due to the dynamic air pressure, thus a separate focusing servomechanism function is not performed. Therefore, in the optical head, there is no focusing servo-mechanism to correspond to a defocus amount representing a degree of variation in a focus position of a beam spot due to temperature or wavelength variations. Since, in the conventional optical recording and reproducing apparatus 80, a wavelength of the beam varies with temperature variations within about ±15 nm, the optical head must be configured so that the defocus amount of the optical head can be sufficiently small with respect to the wavelength variations of about ±15 nm for stable recording and reproducing.

Figure 3:
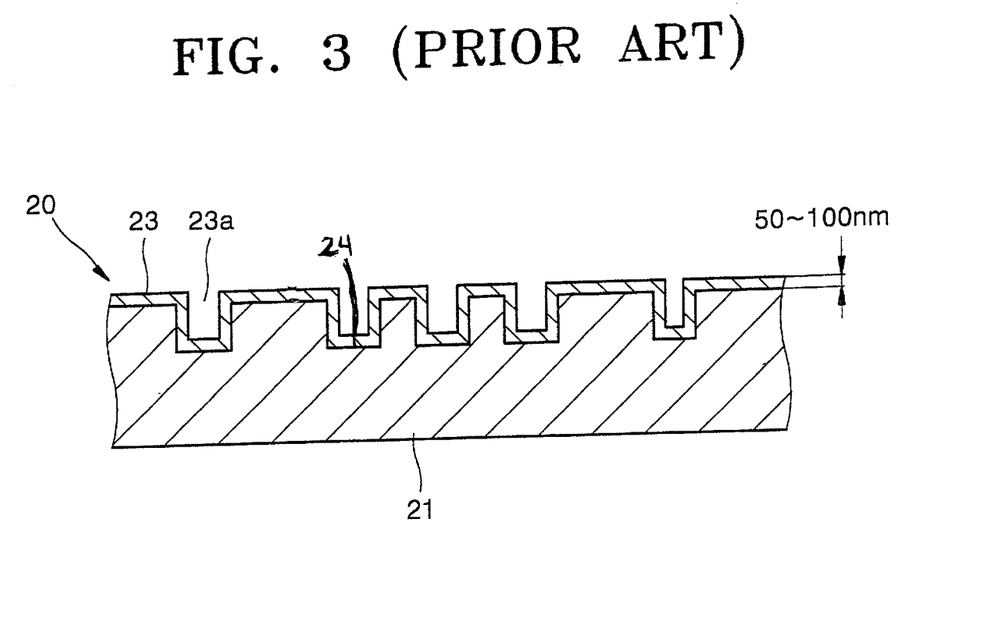
FIG. 3 is a sectional view schematically illustrating a conventional optical disk which can be recorded and reproduced by an optical recording and reproducing apparatus.

Furthermore, the conventional optical disk 20 employed in the above swing-arm type optical recording and reproducing apparatus 80 has a structure shown in FIG. 3. Referring to FIG. 3, an optical disk 20 includes a substrate 21 provided with a spiral groove forming pits 24 on a surface thereof, and a protective layer 23 provided on the substrate 21. In the protective layer 23, recessed grooves 23a face the slider 5 and correspond to the pits 24.

The protective layer 23 has a thickness of about 50 to 100 nm, and a depth of the recessed grooves 23a is about 130 nm. Since the recessed grooves 23a are formed, a floatation height of the slider 5 is about 20 to 100 nm. Thus, there is a problem of unstable movement of the slider 5.

Furthermore, since the light source 11 and the photodetector 13 are installed on the mount 3, the light beam reflected from the optical disk 20 directly passes through air while returning to the photodetector 13 Thus, there is a further problem of significant light loss along the optical path.

Still further, since the focusing servochanism function is not performed, when defocus representing the degree of variation in the focus position due to variations in ambient temperature and variations in the wavelength of the light of the light source occurs, significant errors in the recording/reproducing of information may occur.

Additionally, as a recording density of the optical disk 20 becomes denser, the optical recording and reproducing apparatus 80 requires a mechanism for performing precise servo tracking of the slider 5 so that an optical spot formed on the optical disk 20 can be precisely focused. However, the conventional optical recording and reproducing apparatus 80 performs servo tracking with the actuator 6, which drives the swing arm 2 without a separate actuator for driving the slider 5 independently. Thus, the optical recording and reproducing apparatus 80 is problematic because it is difficult to control the slider 5 precisely.

SUMMARY OF THE INVENTION

Accordingly, it is an object of the present invention to provide an optical disk which can be applied to a swing-arm type optical recording and reproducing apparatus adapted to minimizing variations in the floatation height of a slider floated by a dynamic air pressure.

It is another object of the present invention to provide a swing-arm type optical recording and reproducing apparatus having an improved structure capable of restraining the amount of defocus due to variations in ambient temperature and the wavelength of the light of a light source.

Additional objects and advantages of the invention will be set forth in part in the description which follows, and, in part, will be obvious from the description, or may learned by practice of the invention.

The foregoing objects of the present invention are achieved by providing an optical disk applicable to a swing-arm type optical recording and reproducing apparatus, which is rotatably installed on a spindle motor so that information can be recorded on or reproduced from the optical disk by a slider of the optical recording and reproducing apparatus. The slider moves while floating at a predetermined height due to a dynamic air pressure in order to reduce variations in the floating height of the slider. The optical disk includes a substrate having an information recording surface for recording and reproducing an information signal, and a protective layer provided on the information recording surface. The protective layer has a flat even surface that faces the slider.

The above objects of the present invention may also be achieved by providing a swing-arm type optical recording and reproducing apparatus including a swing arm installed in order to be pivoted in a radial direction of an optical disk by a driving source; a suspension with one end fixed to the swing arm for elastically biasing the other end thereof; a slider installed on a surface of the end portion of the suspension facing the optical disk; and an optical head installed at the swing arm and the slider for recording and reproducing information. The optical head restrains defocus due to variations in ambient temperature and variations in the wavelength of the light of a light source, and includes a light source provided at the swing arm for emitting light of a predetermined wavelength; an optical path changing unit provided in the optical path of the light emitted from the light source, changing the proceeding path of incident light; an objective lens installed at the slider, converging the light which is emitted from the light source and enters via the optical path changing unit to form an optical spot on the optical disk; and a photodetector receiving the light which is reflected from the optical disk and enters via the objective lens and the optical path changing unit to detect an information signal and an error signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 4:
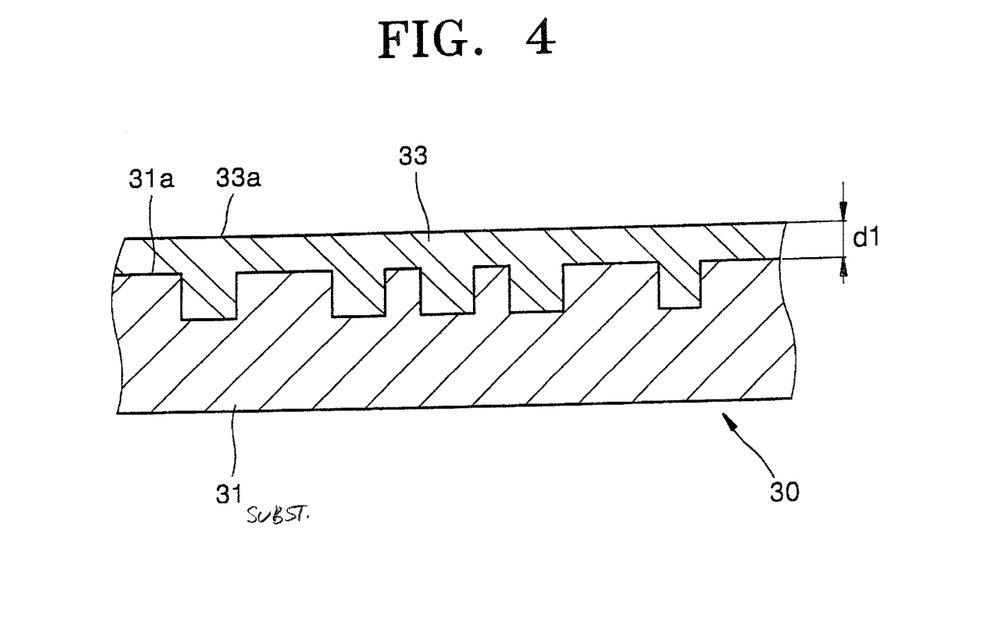
FIG. 4 is a sectional view schematically illustrating an optical disk according to one embodiment of the present invention, which can be recorded and reproduced by an optical recording and reproducing apparatus.
Figure 5:
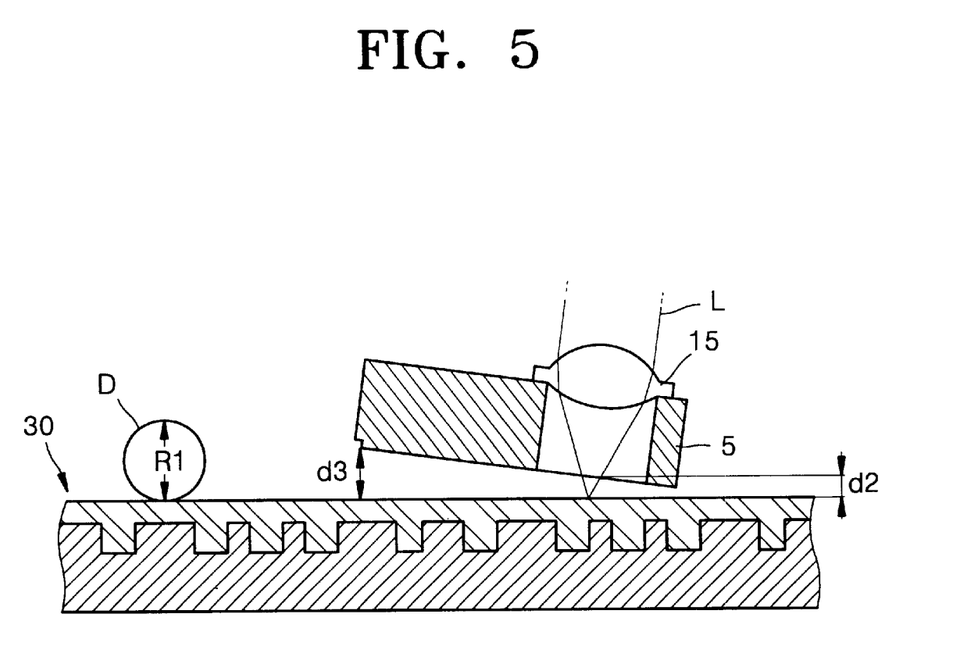
FIG. 5 is a sectional view illustrating the operation of an optical recording and reproducing apparatus when the apparatus employs the optical disk of FIG. 4.

Referring to FIGS. 4 and 5, an optical disk 30 which can be applied to a swing-arm type optical recording and reproducing apparatus according to an embodiment of the present invention is rotatably installed on a spindle motor (not shown) similar to spindle motor 1 of FIGS. 1 and 2, and includes a substrate 31 having an information recording surface 31a, and a protective layer 33 provided on the substrate 31.

An information signal is recorded on or reproduced from the information recording surface 31a. A spiral groove for defining a track and pits, which comprise an information signal, are formed on the information recording surface 31a. The protective layer 33 is provided on the information recording surface 31a, and a surface 33a facing a slider 5 is a flat surface. Therefore, when the slider 5 is floated by dynamic air pressure, variations in a floatation height of the slider 5 can be reduced.

In order to reduce the effect of a dust particle (D), having a diameter R1, adhering to the surface 33a of the protective layer 33, it is preferable that a thickness d1 of the protective layer 33 satisfies the following formula:

$$1 \leq d1 \leq 5 \ \mu m. \tag{1}$$

Furthermore, when R1 is less than or equal to 1.4 mm, the dust particle has almost no influence on the information reproduction from the optical disk 30 when the thickness d1 of the protective layer 33 follows Equation 1.

Here, the conditional range of the thickness d1 of the protective layer 33 is determined by a range of a thickness variation $\Delta d1$ of the protective layer 33 according to the following formula:

$$\Delta dl < \frac{\lambda}{2NA^2} \tag{2}$$

where $\lambda$ is a wavelength of light of a light source, and NA is a numerical aperture of an objective lens. Following formula 2 minimizes defocus of an optical spot.

On the other hand, when the maximum distance between the surface 33a of the protective layer 33 and the slider 5 is d3, a dust particle having an R1 greater than 1.4 mm would be removed by the slider 5 since d3 is kept to within about 0.7 μm. Here, when the distance between the slider 5 and the optical disk 30 along an optical axis of the light converged by an objective lens 15 is d2, d2 is kept to about 0.05 μm.

Figure 6:
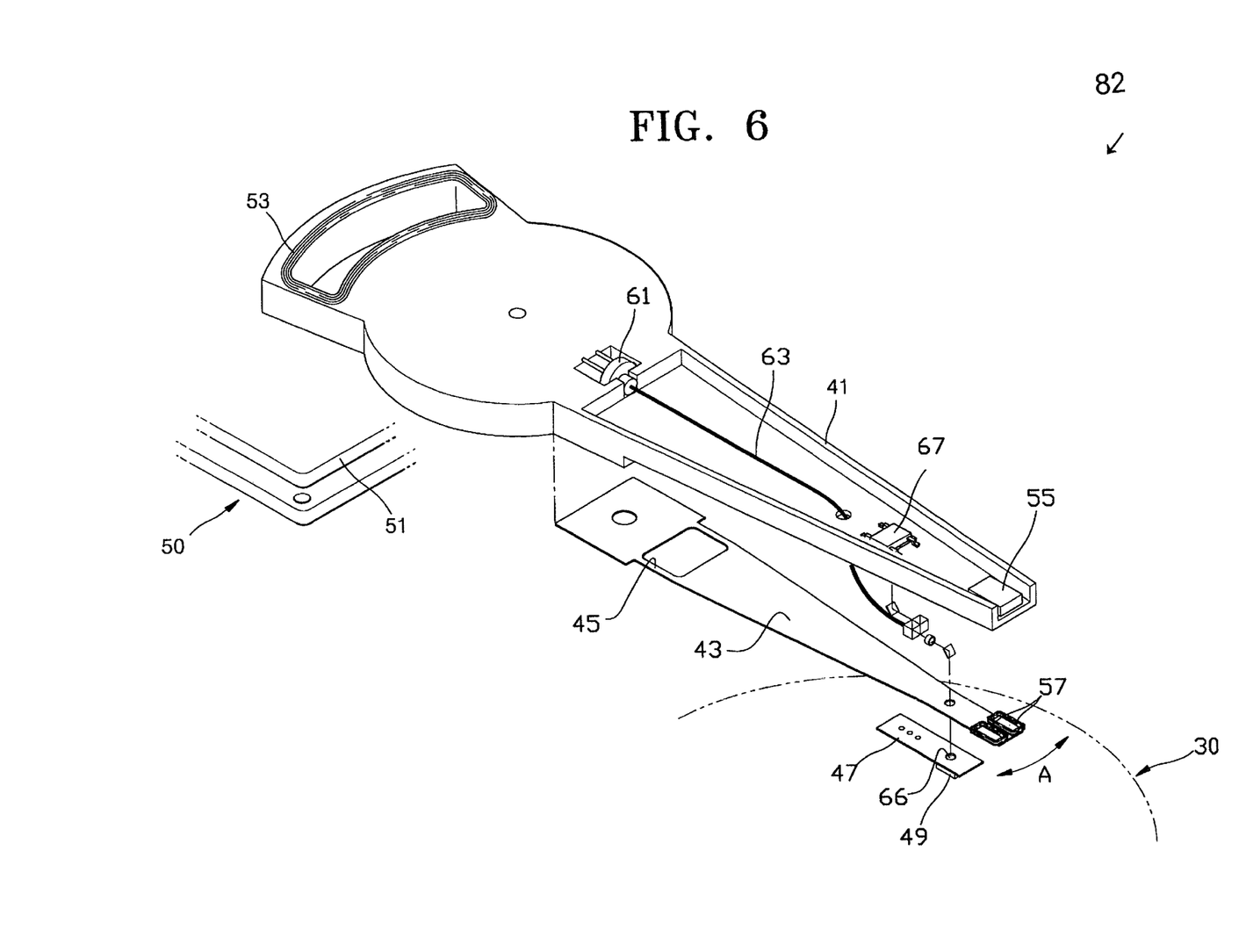
FIG. 6 is an exploded perspective view schematically illustrating a swing-arm type optical recording and reproducing apparatus according to a first embodiment of the present invention.

Referring to FIG. 6, a swing-arm type optical recording and reproducing apparatus 82 according to one embodiment of the present invention includes a first driving source 50, a swing arm 41 installed to be pivoted in a radial direction of the optical disk 30 by the first driving source 50, a suspension 43, one end of which is fixed to the swing arm 41, and the other end thereof being elastically biased, a slider 49 installed at one surface of the other end of the suspension 43, which faces the optical disk 30, and an optical head for recording and reproducing information. The optical disk 30 is rotatably installed on a spindle motor installed on a base (not shown), and it is preferable that the optical disk 30 has a structure as shown in FIGS. 4 and 5.

The first driving source 50 is intended to drive the slider 49 in the radial direction of the optical disk 30 (in the direction of arrow A) by pivoting the swing arm 41. The first driving source 50 is comprised of a first magnet 51 fixedly disposed on the base, and a first coil member 53 provided at the end portion of the swing arm 41 corresponding to the first magnet 51.

The suspension 43 has a structure of a leaf spring, and allows the slider 49, installed at one end thereof by means of a fixing plate 47, to be aerodynamically suspended over the optical disk 30. Therefore, when the slider 49 is operated, the floatation height of the slider 49 due to dynamic air pressure is determined at a position where the elastic force of the suspension 43 is in equilibrium with the dynamic air pressure. One end of the fixing plate 47 is connected to the suspension 43, and the fixing plate 47 is intended to secure a space for installing the slider 49 and an objective lens 66.

Furthermore, it is preferable that a hinge portion 45 is provided at the suspension 43 so that the end of the suspension 43 where the slider 49 is installed can be pivoted slightly with respect to the swing arm 41, and a second driving source is provided for driving the end of the suspension 43 so that a track error can be corrected. To this end, the second driving source is comprised of a second magnet 55 installed at one end of the swing arm 41, and a second coil member 57 installed at one end of the suspension 43.

The mechanical operation of the optical recording and reproducing apparatus 82 will now be described. First, when information is recorded on or reproduced from the optical disk 30, the optical disk 30 is rotated at a high speed. At this time, the slider 49 is floated from the optical disk 30 due to the dynamic air pressure, and the distance between the optical disk 30 and the slider 49 along the optical axis is approximately 0.05 μm. In this state, the first driving source 50 is operated to pivot the swing arm 41 in the direction of arrow A so that the objective lens 66 can be positioned on the track where information is required to be recorded/reproduced. At this time, correction of a track error of the objective lens 66 with respect to the track direction of the optical disk 30 is performed by an interactive electromagnetic force between the second coil member 57 provided at the suspension 43 and the second magnet 55 provided at the swing arm 41. That is, the track error is corrected by slight pivoting of the suspension 43 with respect to the swing arm 41 by the interactive electromagnetic force.

Now, preferred embodiments of the optical head will be described in detail with reference to FIGS. 7 through 13.

Figure 7:
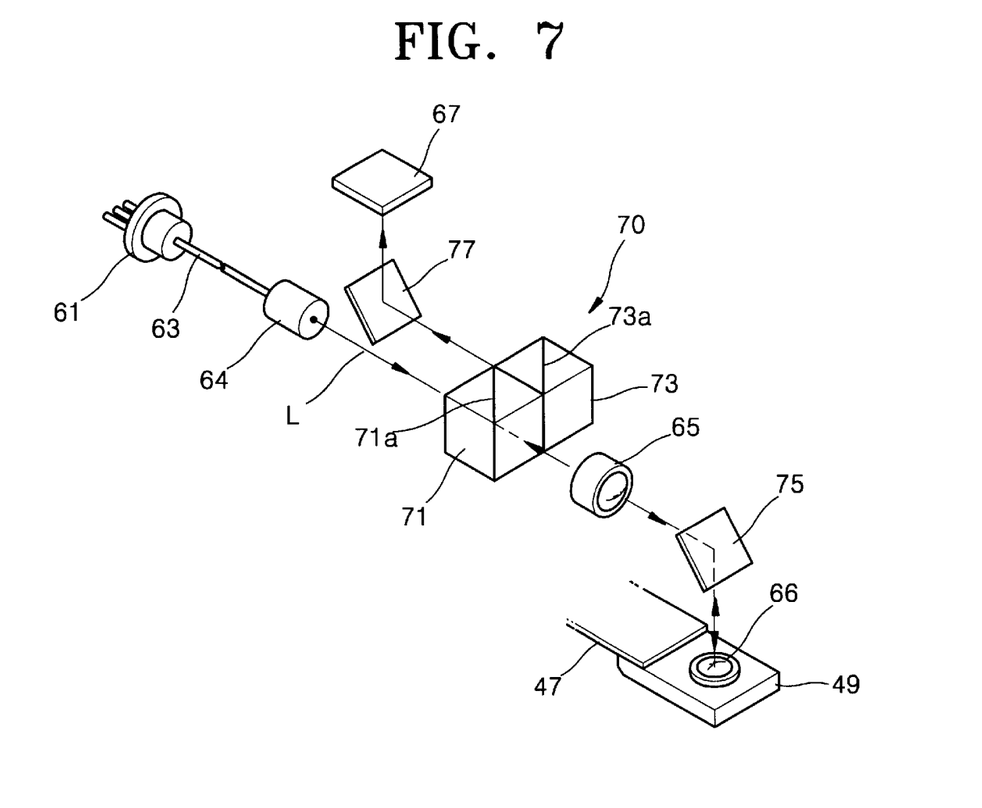
FIG. 7 is an exploded perspective view schematically illustrating an optical head of the optical recording and reproducing apparatus shown in FIG. 6.

The optical head includes a light source 61 provided at the swing arm 41 for emitting light having a predetermined wavelength, an optical path changing unit 70 changing the path of light, a collimating lens 65 converging incident light, an objective lens 66 installed on the slider 49, and a photodetector 67 receiving the light reflected from the optical disk 30, and detecting an information signal and an error signal. The collimating lens 65 is installed at the slider 49, converging incident light, and preventing defocus due to variations in ambient temperature and variations in the wavelength of the light of the light source 61. The objective lens 66 converges the light converged by the collimating lens 65 again, and forms an optical spot on the optical disk.

Referring to FIG. 7, the light emitted from the light source 61 is transferred to the optical path changing unit 70 via an optical fiber 63. One end of the optical fiber 63 is connected to the light outputting end of the light source 61, and the other end is connected to a glass ferule 64, and the glass ferule 64 is fixedly disposed in the optical path between the light source 61 and the optical path changing unit 70. When the optical fiber 63 is used in this manner, the light emitted from the light source 61 can change direction and be transferred to the optical path changing unit 70 without requiring a reflecting member, thereby realizing the advantage of a compact structure.

The optical path changing unit 70 is comprised of first and second beam splitters 71 and 73, respectively, which are integrally formed and have first and second mirror surfaces 71a and 73a, respectively. The optical path changing unit 70 further comprises first and second reflecting members 75 and 77, respectively for totally reflecting incident light and changing the direction of the light.

The first beam splitter 71 reflects and transmits, and therefore splits the incident light onto the first mirror surface 71a in a predetermined ratio. Therefore, the transmitting light of the light entering from the light source 61 is used as an effective light, and the reflecting light of the light entering from the objective lens 66 is used as an effective light. The first mirror surface 71a is disposed to reflect incident light in a direction on a plane parallel to the information recording surface 31a of the optical disk 30. The first reflecting member 75 is provided in the optical path between the first beam splitter 71 and the objective lens 66, and reflects the light after passing through the first beam splitter 71 and the collimating lens 65 toward the information recording surface 33a of the optical disk 30. The second beam splitter 73 is reflects and transmits, and therefore splits the incident light onto the second mirror surface 73a in a predetermined ratio. The second beam splitter 73 reflects the light entering via the first reflecting member 75, the collimating lens 65, and the first beam splitter 71 after being reflected from the optical disk 30 in a direction parallel to a lengthwise direction of the slider 49. The second reflecting member 77 reflects the incident beam from the second beam splitter 73 toward the photodetector 67.

Since the direction of the light emitted from the light source 61 and the direction of the light reflected from the optical disk 30 can be separated from each other and be parallel to each other by employing the optical path changing unit as described above, there is an advantage in that the optical head can be easily disposed in a small space on the swing arm.

Figure 8:
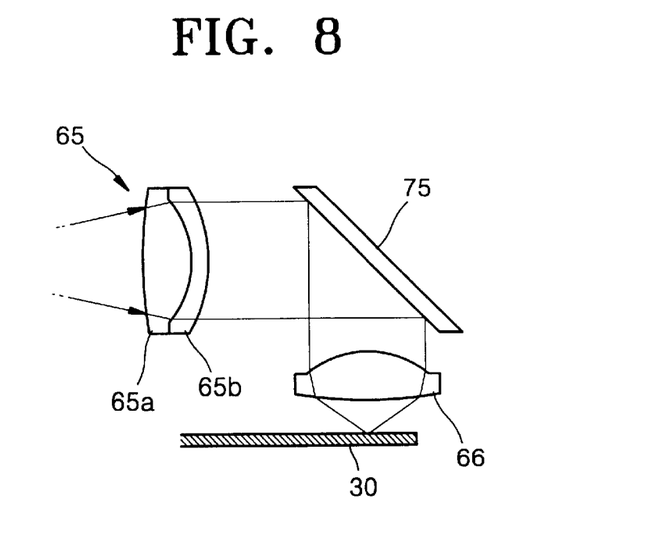
FIG. 8 is a schematic diagram illustrating an optical layout of a portion of optical elements of the optical head shown in FIG. 6.

It is preferable that the collimating lens 65 is configured as shown in FIG. 8 so that defocus can be prevented. Referring to FIG. 8, the collimating lens 65 includes a first collimating lens 65a, and a second collimating lens 65b integrally bonded to the objective lens side surface of the first collimating lens 65a. Here, when the Abbe numbers of the first and second collimating lenses 65a and 65b are $v_{CL1}$ and $v_{CL2}$, respectively, it is preferable that the difference $|v_{CL2}-v_{CL1}|$ satisfies the following Equation $$|v_{CL2}-v_{CL1}|>18.0. \tag{3}$$

Here, an Abbe number is an integer representing an optical dispersion of an optical element. When the difference between the Abbe numbers of the first and second collimating lenses 65a and 65b is greater than 18.0, differences in the optical path due to variations in the wavelength of the light emitted from the light source 62 according to variations in ambient temperature can be significantly reduced.

Furthermore, the collimating lens 65 changes incident diverging light into parallel light, and it is preferable that the numerical aperture thereof satisfies the following equation:

$$NA_{CL}<0.4. \tag{4}$$

Furthermore, the diameter of the collimating lens 65 is preferably 2.5 mm or less. Thus, the total height of the optical recording and reproducing apparatus 82 measured from the optical disk 30, is 4.0 mm or less, resulting in a thinner structure for the optical recording and reproducing apparatus 82.

Figure 9:
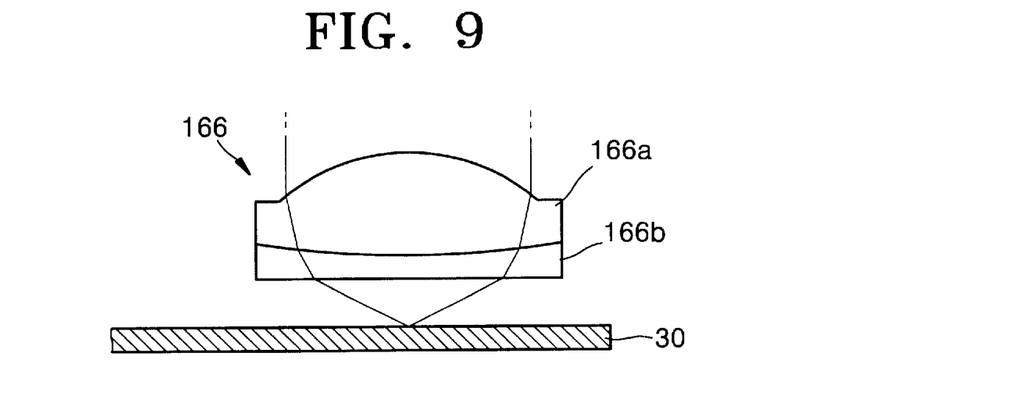
FIG. 9 is a schematic diagram illustrating a first embodiment of an objective lens of FIG. 6.
Figure 10:
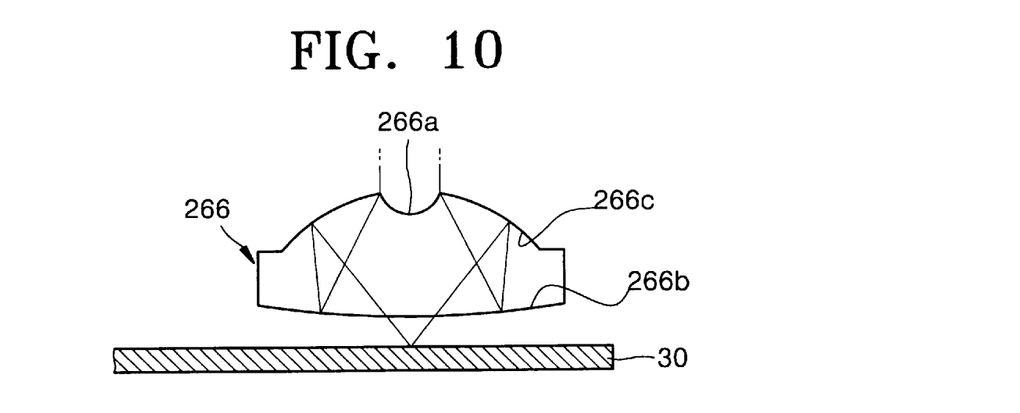
FIG. 10 is a schematic diagram illustrating a second embodiment of an objective lens of FIG. 6.
Figure 11:
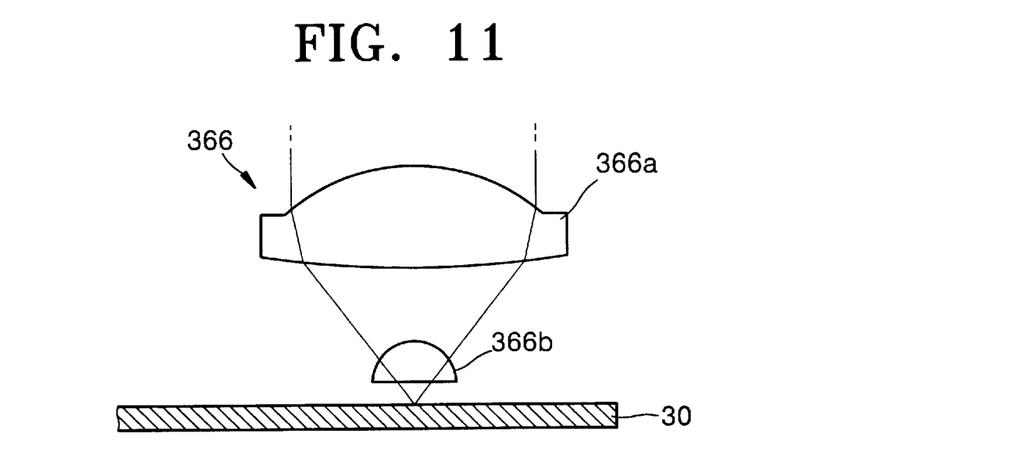
FIG. 11 is a schematic diagram illustrating a third embodiment of an objective lens of FIG. 6.

Furthermore, the objective lens 66 can be configured as shown in FIGS. 9 through 11 so that the above-mentioned defocus can be prevented.

Referring to FIG. 9, an objective lens 166 according to a first embodiment includes a first objective lens 166a having an Abbe number $v_{OL1}$, and a second objective lens 166b integrally formed at a surface of the first objective lens 166a facing an optical disk 30, and having an Abbe number $v_{OL2}$.

Here, it is preferable that the difference $|v_{OL2}-v_{OL1}|$ between the Abbe numbers of the first and second objective lenses 166a and 166b satisfies:

$$|v_{OL2}-v_{OL1}|>18.0. \tag{5}$$

By establishing this difference between Abbe numbers, it is possible to significantly reduce the defocus amount that occurs due to variations in the wavelength of the light emitted from the light source 61 according to variations in ambient temperature.

Referring to FIG. 10, an objective lens 266 is comprised of a solid immersion lens (SIL) having a lens performance of a high numerical aperture, greater than 1.0. The objective lens 266 includes a transmitting portion 266a for transmitting and diverging the light entering from the collimating lens 65 (FIG. 7), a transmitting/reflecting portion 266b transmitting or reflecting incident light according to an angle of incidence of the light, and a reflecting portion 266c reflecting and converging incident light. The reflecting portion 266c is provided around the transmitting portion 266a, and converges and reflects the diverging light entering from the transmitting/reflecting portion 266b. The transmitting/reflecting portion 266b is provided on a surface of the objective lens 266 which faces an optical disk 30, and reflects and diverges the diverging light that has passed through and is entering from the transmitting portion 266a, and transmits the converging light from the reflecting portion 266c. As described above, since the size of the optical spot formed on the optical disk 30 can be reduced by employing an objective lens having a high numerical aperture, the allowable amount of defocus is greater. Therefore, this design is advantageous because a greater error in the wavelength of the light of a light source 61 can be tolerated.

Referring to FIG. 11, an objective lens 366 according a third embodiment includes a first objective lens 366a having an Abbe number $v_{OL3}$, and a second objective lens 366b provided between the first objective lens 366a and an optical disk 30, and having an Abbe number $v_{OL4}$. The second objective lens 366b is disposed to be close to the optical disk 30, further converging the light converged by the first objective lens 366a. Here, it is preferable that the difference $|v_{OL4}-v_{OL3}|$ between the Abbe numbers of the first and second objective lenses 366a and 366b satisfies:

$$|v_{OL4}-v_{OL3}|>18.0. \tag{6}$$

By establishing this difference between Abbe numbers, it is possible to significantly reduce the defocus amount occurring due to variations in the wavelength of the light emitted from the light source 61 according to variations in ambient temperature.

Figure 12:
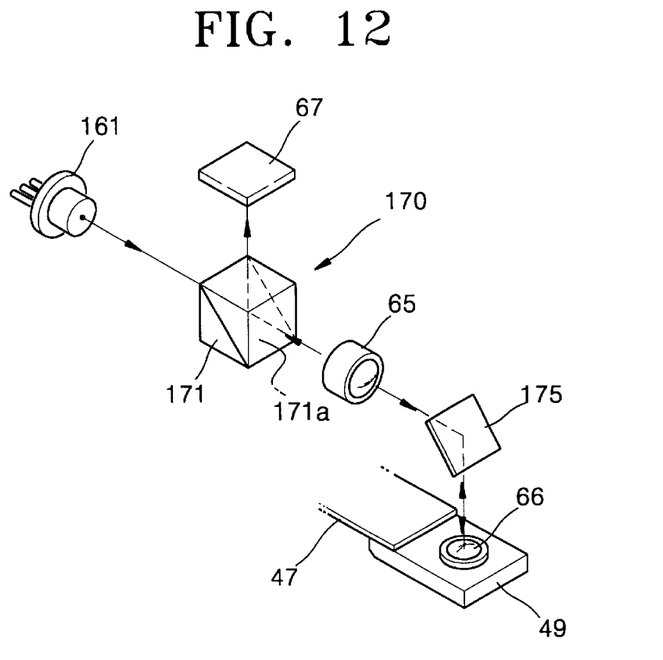
FIG. 12 is an exploded perspective view schematically illustrating an optical head of a swing-arm type optical recording and reproducing apparatus according to another embodiment of the present invention.
Figure 13:
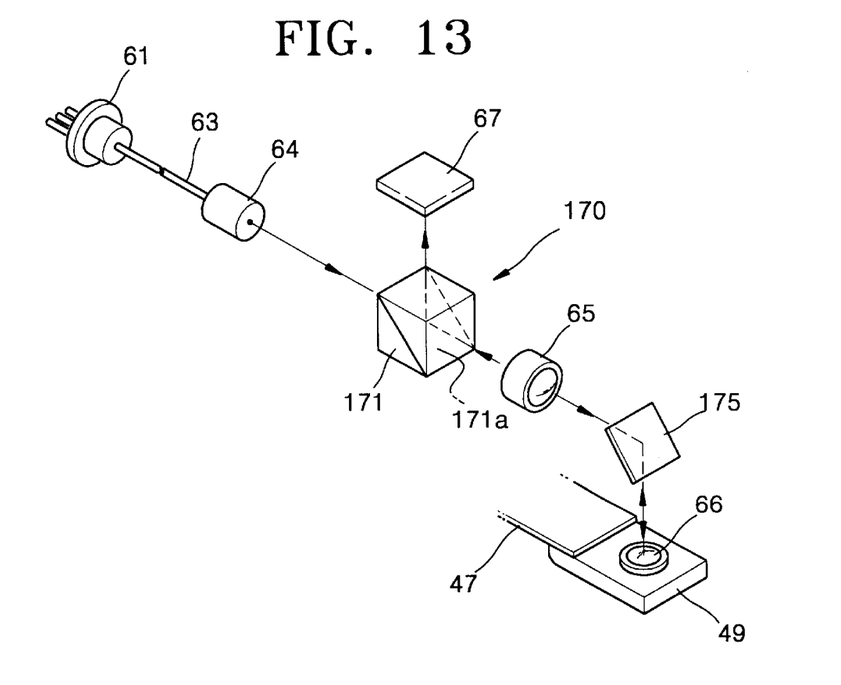
FIG. 13 is an exploded perspective view schematically illustrating an optical head of a swing-arm type optical recording and reproducing apparatus according to still another embodiment of the present invention.

The above-mentioned optical head can also be modified as shown in FIGS. 12 and 13.

Referring to FIG. 12, in an optical head according to another embodiment, the light emitted from a light source 61 is transmitted to an optical path changing unit 170 through free space without the previously described optical fiber 63.

The optical path changing unit 170 is comprised of one beam splitter 171, and one reflecting member 175. The beam splitter 171 has a mirror surface 171a adapted to transmit the light from the light source 61, and to reflect the light from an objective lens 66 toward a photodetector 67. The reflecting member 175 is provided in the optical path between the beam splitter 171 and the objective lens 66 for changing the path of the light that has passed through the beam splitter 171 from a lengthwise direction of a swing arm to a vertical direction of an optical disk 30.

Referring to FIG. 13, an optical head according to still another embodiment further comprises an optical fiber 63 in addition to the structure of the optical head described with reference to FIG. 12. The optical fiber 63 is disposed between a light source 61 and an optical path changing means 170 so that the optical disposition between the light source 61 and a beam splitter 171 can be easily performed. In this case, one end of the optical fiber 63 is connected to the light outputting end of the light source 61, and the other end is connected to a glass ferule 64, and the glass ferule 64 is fixedly disposed in the optical path between the light source 61 and the optical path changing means 170.

The above-described optical disk according to the present invention is is advantageous as compared to the prior art because variations in the floatation height of the slider are reduced as a result of the surface facing the slider being a flat even surface. A further advantage is that dust accumulated on the flat surface can be removed.

Furthermore, in the optical recording and reproducing apparatus configured as described above, optical elements can be effectively disposed in the small space on a swing arm by improving a structure of an optical path changing unit. Still further, by employing an optical fiber, loss of the light emitted from a light source is reduced. Further, defocus due to variations in the wavelength of the light of a light source, and, therefore, errors in recording and reproducing an information signal, can be reduced.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk applicable to a swing-arm type optical recording and reproducing apparatus, rotatably installed on a spindle motor so that an information signal is recorded on or reproduced from the optical disk by a slider of the optical recording and reproducing apparatus, the slider moving while floating at a predetermined height due to a dynamic air pressure in order to reduce variations in the floating height of the slider, the optical disk comprising:

a substrate having an information recording surface to record and reproduce the information signal; and a protective layer provided on the information recording surface and having a surface facing the slider being a flat even surface, wherein a thickness d1 of the protective layer satisfies $1 \geq d1 \geq 5$ μm.

2. A swing-arm type optical recording and reproducing apparatus comprising:

a swing arm installed to be pivoted in a radial direction of an optical disk by a driving source;

a suspension having a first end fixed to the swing arm to elastically bias a second end;

a slider installed on a surface of the second end of the suspension facing the optical disk; and an optical head installed at the swing arm and the slider to record and reproduce information on/from the optical disk, the optical head comprising:

a light source provided at the swing arm to emit light of a predetermined wavelength;

an optical path changing unit provided in an optical path of the light emitted from the light source to change a proceeding path of the light;

an objective lens installed at the slider to converge the light emitted from the light source and then passed through the optical path changing means to form an optical spot on the optical disk; and a photodetector to receive light reflected from the optical disk and then passing through the objective lens and through the optical path changing unit and to detect an information signal and an error signal from the received reflected light, wherein the optical head restrains a defocus due to variations in ambient temperature and variations in the wavelength of the light emitted by the light source, and wherein the apparatus further comprises:

a collimating lens along the optical path between the objective lens and the optical path changing unit comprising a first collimating lens having an Abbe number $v_{CL1}$; and a second collimating lens integrally formed on a surface of the first collimating lens and having an Abbe number $v_{CL2}$, wherein the difference $|v_{CL2}-v_{CL1}|$ between the Abbe numbers of the first and second collimating lenses satisfies $|v_{CL2}-v_{CL1}|>18.0$.

3. The swing-arm type optical recording and reproducing apparatus as claimed in claim 2, wherein a numerical aperture of the collimating lens satisfies $NA_{CL}<0.4$.

4. The swing-arm type optical recording and reproducing apparatus as claimed in claim 2, wherein a diameter of the collimating lens is 2.5 mm or less and a total height of the optical recording and reproducing apparatus measured from the optical disk is 4.0 mm or less.

5. The swing-arm type optical recording and reproducing apparatus as claimed in claim 2, wherein the objective lens comprises:

a first objective lens having an Abbe number $v_{OL1}$ to converge the light emitted from the light source; and a second objective lens integrally formed on a surface of the first objective lens facing the optical disk and having an Abbe number $v_{OL2}$, and wherein the difference $|v_{OL2}-v_{OL1}|$ between the Abbe numbers of the first and the second objective lenses satisfies $|v_{OL2}-v_{OL1}|>18.0$.

6. The swing-arm type optical recording and reproducing apparatus as claimed in claim 2, wherein the objective lens comprises:

a transmitting portion to diverge light passing from the collimating lens;

a reflecting portion provided around the transmitting portion to reflect and and converge incident light; and a transmitting/reflecting portion to reflect diverging light having passed through the transmitting portion toward the reflecting portion as the incident light to the reflecting portion, and to transmit the converging light reflected by the reflecting portion.

7. The swing-arm type optical recording and reproducing apparatus as claimed in claim 2, wherein the objective lens comprises:

a first objective lens having an Abbe number $v_{OL3}$ to converge the light emitted from the light source; and a second objective lens provided between the first objective lens and the optical disk to further converge the light converged by the first objective lens and to form an optical spot on the optical disk, and having an Abbe number $v_{OL4}$, wherein the difference $|v_{OL4}-v_{OL3}|$ between the Abbe numbers of the first and the second objective lenses satisfies $|v_{OL4}-v_{OL3}|>18.0$.

8. The swing-arm type optical recording and reproducing apparatus as claimed in claim 2, wherein the optical path changing unit comprises:

a first beam splitter to transmit the light emitted from the light source, and to reflect light arriving from the objective lens in a direction parallel to an information surface of the optical disk;

a first reflecting member to reflect the light proceeding after having passed through the first beam splitter and the collimating lens toward the information surface of the optical disk;

a second beam splitter provided near the first beam splitter to reflect the light, entering via the first reflecting member, the collimating lens, and the first beam splitter after having been reflected from the optical disk, in a direction parallel to a lengthwise direction of the slider; and a second reflecting member to reflect the light from the second beam splitter toward the photodetector.

9. The swing-arm type optical recording and reproducing apparatus as claimed in claim 2, wherein the optical path changing unit comprises:

a beam splitter to transmit the light emitted from the light source, and to reflect the light passing from the objective lens toward the photodetector; and a reflecting member to reflect the light proceeding after having passed through the beam splitter and the collimating lens toward an information surface of the optical disk.

10. The swing-arm type optical recording and reproducing apparatus as claimed in claim 2, further comprising an optical fiber provided in the optical path between the light source and the optical path changing means to guide the light emitted from the light source.

11. An optical disk comprising:

an information recording surface; and a protective layer provided on said information recording surface, said protective layer comprising a flat surface and having a thickness d1 that satisfies $1 \geq d1 \geq 5$ μm.

12. An optical recording and reproducing apparatus comprising:
  an optical disk to record and reproduce information, the optical disk comprising an information recording surface and a protective layer including a flat surface provided on said information recording surface; and
  a swing arm floating above said optical disk at a substantially constant floating height of 0.05 microns.

13. The optical recording and reproducing apparatus as claimed in claim 12, wherein the optical recording and reproducing apparatus further comprises a suspension fixed to said swing arm, said suspension including a slider, wherein the flat surface of said protective layer faces said slider.

14. A method to reduce a deviation of a swing arm of a reproducing/recording apparatus above an optical disk to record/reproduce information, comprising:
  providing a disk comprising an information recording surface and a protective layer including a flat surface provided on said information recording surface and having a thickness d1 that satisfies $1 \geq d1 \geq 5$ $\mu$m; and
  floating the swing arm above said optical disk at a substantially constant height of 0.05 microns.

15. A swing-arm type optical system used with an optical disk, comprising:
  a swing arm pivotable in a radial direction of the optical disk;
  an optical pickup, mounted on the swing arm, focusing a light beam onto a recording surface of the optical disk, said optical pickup comprising an optical path changing unit; and a collimating lens positioned on an optical path of the light beam between said optical path changing unit and the optical disk, preventing defocus due to variations in ambient temperature and variations in a wavelength of the light beam,
  wherein said collimating lens comprises:
    a first collimating lens, and
    a second collimating lens in contact with said first collimating lens, and
  wherein said first collimating lens has an Abbe number Vc|1 and said second collimating lens has an Abbe number Vc|2, wherein |Vc|2−Vc|1|>18.0.

16. The optical system as claimed in claim 15, wherein the optical pickup further comprises a light source generating the light beam.

17. The optical system as claimed in claim 16, further comprising an optical fiber connected to said light source at a first end thereof, and connected to a ferule at a second end thereof.

18. The optical system as claimed in claim 17, wherein said ferule transfers the light beam to said optical path changing unit.

19. The optical system as claimed in claim 16, wherein said optical path changing unit separates the light beam generated by the light source from a light beam reflected from the optical disk.

20. The optical system as claimed in claim 15, wherein a height of the optical system as measured from the optical disk is 4.0 mm or less.

21. The optical system as claimed in claim 16, further comprising an objective lens disposed on the optical path of the light beam between said optical path changing unit and said optical disk, said objective lens comprising:
  a first objective lens; and
  a second objective lens disposed between said first objective lens and the optical disk.

22. The optical system as claimed in claim 21, wherein said first objective lens is in contact with said second objective lens.

23. The optical system as claimed in claim 22, wherein said first objective lens has an Abbe number Vol1 and said second objective lens has an Abbe number Vol2, wherein |Vol2−Vol1|>18.0.

24. The optical system as claimed in claim 21, wherein said first objective lens is a predetermined distance from said second objective lens, said first objective lens has an Abbe number Vol3 and said second objective lens has an Abbe number Vol4, wherein |Vol4−Vol3|>18.0.

25. The optical system as claimed in claim 21, wherein said objective lens comprises:
  a transmitting portion to transmit light entering from said collimating lens;
  a reflecting portion provided around the transmitting portion; and
  a transmitting/reflecting portion provided on a surface of said objective lens that faces the optical disk.

26. The optical system as claimed in claim 21, wherein the optical system further comprises a slide element receiving the objective lens, and the optical path changing unit further comprises:
  a photodetector;
  a first beam splitter to transmit the light emitted from the light source, and to reflect light arriving from the objective lens in a direction parallel to the recording surface of the optical disk;
  a first reflecting member to reflect the light proceeding after having passed through the first beam splitter and the collimating lens toward the recording surface of the optical disk;
  a second beam splitter provided near the first beam splitter to reflect the light, entering via the first reflecting member, the collimating lens, and the first beam splitter after having been reflected from the optical disk, in a direction parallel to a lengthwise direction of the slide element; and
  a second reflecting member to reflect the light from the second beam splitter toward the photodetector.

27. The optical system as claimed in claim 26, further comprising a suspension to apply an elastic force to said slide element, wherein a flotation height of the slide element above the optical disk due to a dynamic air pressure is determined at a position where the dynamic air pressure is in equilibrium with the elastic force of said suspension.

28. The optical system as claimed in claim 21, wherein said optical path changing unit further comprises:
  a photodetector;
  a beam splitter to transmit the light emitted from the light source, and to reflect the light passing from the objective lens toward the photodetector; and
  a reflecting member to reflect the light proceeding after having passed through the beam splitter and the collimating lens toward the recording surface of the optical disk.

29. The optical system as claimed in claim 28, further comprising an optical fiber provided in the optical path between the light source and the optical path changing means to guide the light emitted from the light source.

30. The optical system as claimed in claim 29, further comprising an actuator arm pivotable in a radial direction of the optical disk, wherein said actuator is pivoted by a driving force of an actuator.

* * * * *

UNITED STATES PATENT AND TRADEMARK OFFICE
CERTIFICATE OF CORRECTION

PATENT NO. : 6,657,942 B2
DATED : December 2, 2003
INVENTOR(S) : Chul-woo Lee et al.

It is certified that error appears in the above-identified patent and that said Letters Patent is hereby corrected as shown below:

Column 9,
Line 10, please change the first occurrence "≧" to -- ≦ --

Column 11,
Line 21, please change the first occurrence "≧" to -- ≦ --

Signed and Sealed this

Thirtieth Day of March, 2004

JON W. DUDAS
*Acting Director of the United States Patent and Trademark Office*